United States Patent
Spear

[11] 3,826,470
[45] July 30, 1974

[54] TRAILER JACK

[75] Inventor: Richard S. Spear, Perrysberg, Ohio

[73] Assignee: B-A-L Products Corporation, a Division of Nova Products, Gardena, Calif.

[22] Filed: May 21, 1973

[21] Appl. No.: 362,491

[52] U.S. Cl. ............................................. 254/86 R
[51] Int. Cl. .............................................. B60s 9/02
[58] Field of Search ............... 254/86 R, 86 H, 124; 280/150.5

[56] References Cited
UNITED STATES PATENTS

| | | | |
|---|---|---|---|
| 2,046,918 | 7/1936 | Kruse | 254/124 |
| 3,345,038 | 10/1967 | Taylor | 254/86 R |
| 3,565,396 | 2/1974 | Spear | 254/86 R |

*Primary Examiner*—Othell M. Simpson
*Assistant Examiner*—Robert C. Watson
*Attorney, Agent, or Firm*—Fulwider Patton Reiber Lee & Utecht

[57] ABSTRACT

In trailer jacks of the scissors type which include a support leg having one end thereof coupled to an elongated screw mounted for rotation in a horizontal frame, the leg being selectively lowered to a supporting position by advancing the one end along the screw and pivoting at the center thereof to a transverse frame member extending horizontally transverse from the frame, the improvement comprising triangular web structures formed in common with the link members to provide column support to said leg when extended. It is specifically contemplated that the web structure further provide longitudinal flanges along the adjacent interior edges thereof, the flanges forming radial extensions from a common central pivot of the leg. At the distal ends the link members include pivotal joints attaching to the extreme ends of the transverse member. In this manner a column structure is formed between the extreme ends of the transverse member of said frame and the central pivot of said leg for providing lateral support to said leg when extended.

7 Claims, 4 Drawing Figures

PATENTED JUL 30 1974　　　　　　　　　　3,826,470
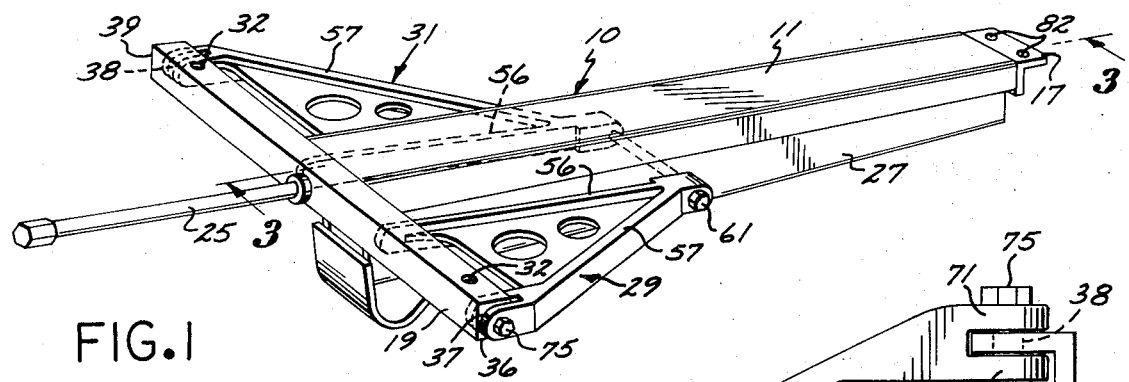
FIG.1
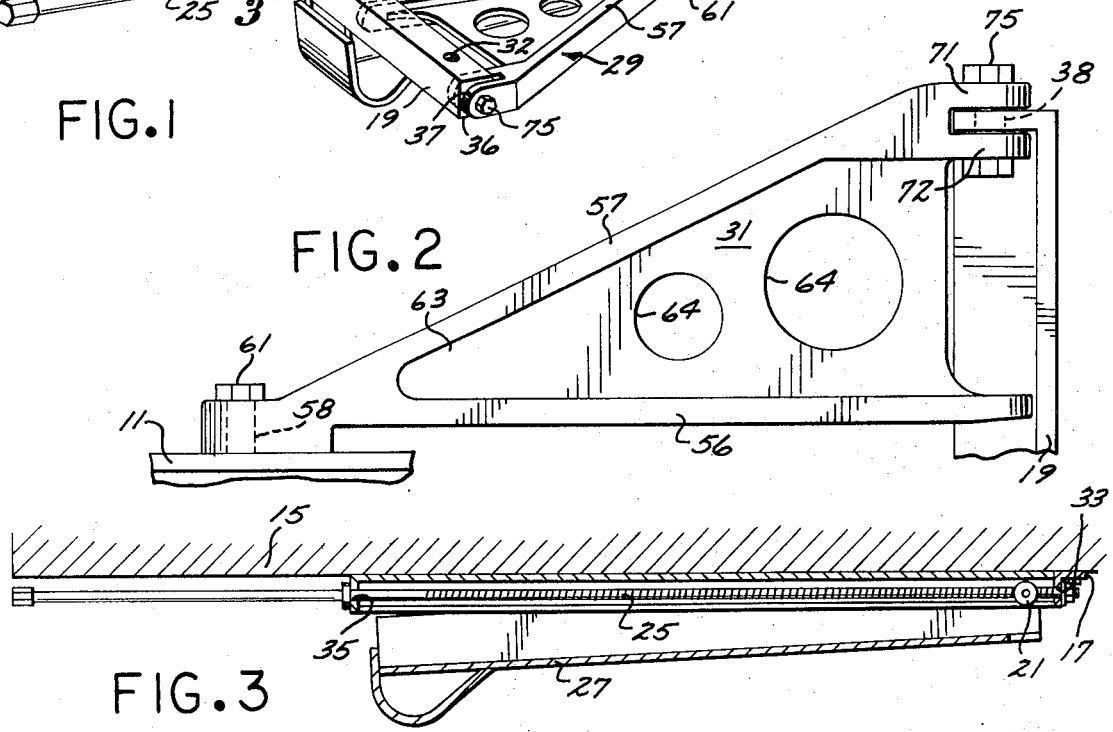
FIG.2
FIG.3
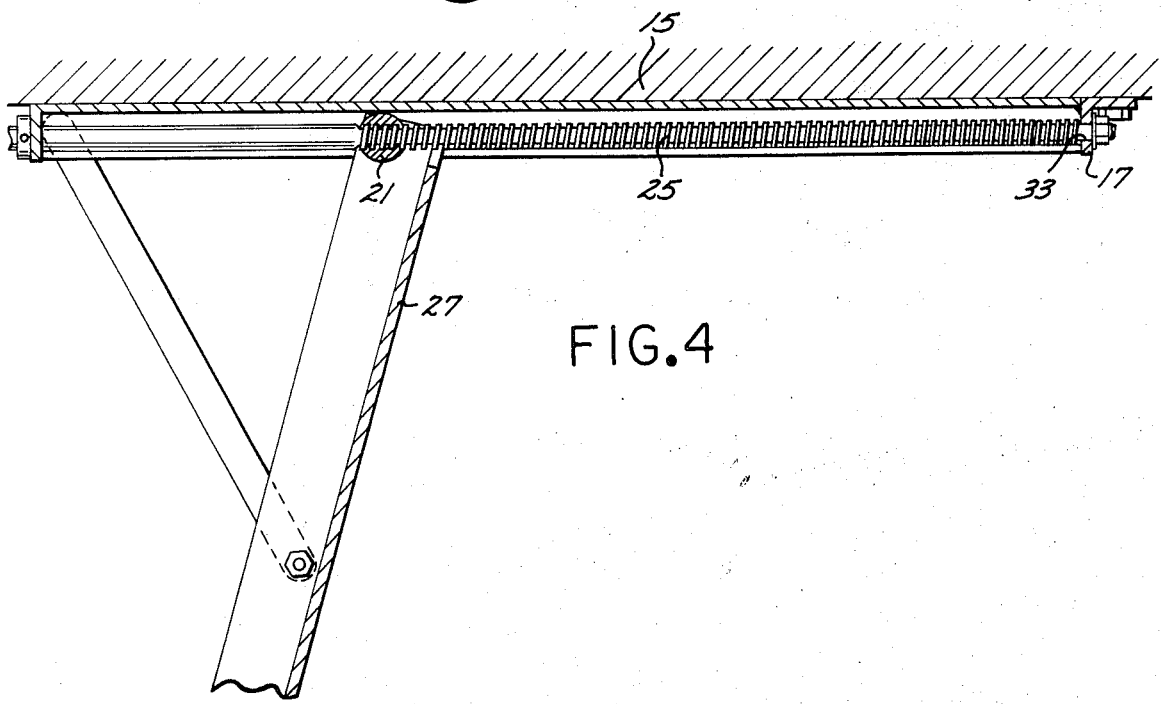
FIG.4

TRAILER JACK

BACKGROUND OF THE INVENTION

1. Field of the Invention

The present invention relates to scissors jacks, and more particularly to scissors jacks disposed to be extended from the bottom surface of a trailer including pivotal connecting links disposed to provide lateral support to the supporting leg of the jack.

While the invention is of general utility, it is particularly suitable for use with, and will be described in connection with, the apparatus of the type shown and described in the U.S. Pat. to Taylor, No. 3,345,038.

2. Description of the Prior Art

Trailer jacks of the scissors type suffer the shortcoming of having the leg supported by cantilever from one of its ends from a screw-engaging mechanism. The free end or the supporting end of the leg is typically unrestrained and is therefore unstable laterally. Heretofore such restraints were provided by the link members connected between one end of the frame and the central pivot of the leg. Since in many applications the trailer jack is deployed at various extension levels the pivotal linking members are very often oriented along shallow or acute angles relative to the horizontal frame and therefore are loaded to high load levels when the leg is loaded laterally. In the prior art it was the common practice to form such link members from metal straps, where such straps provide very little column structure and are therefore effective only when loaded in tension, such tension loading occurring only at fully deployed angles of the support leg.

SUMMARY OF THE INVENTION

Accordingly it is the general purpose and object of the present invention to provide linking members between the supporting leg and the frame of a scissors jack which are structurally adapted to provide column support to said leg. Further objects of the invention are to provide lateral support to the leg of the scissors jack with transfer the load to the frame through compression.

These and other objects are accomplished within the present invention by forming link members which provide triangular web structures extending between flanged edge members, the exterior edge member being pivotally mounted to the ends of a transverse horizontal frame member while the interior or adjacent edge members extend to abut against the transverse frame member along a radius from a pivot joining the vertex of the edge members of flanges which forms the central pivot of the supporting leg, thus providing lateral support in compression when deployed.

BRIEF DESCRIPTION OF THE DRAWINGS

FIG. 1 is an illustration in perspective of a scissors jack constructed according to the present invention;

FIG. 2 is a plan view, in enlarged scale, of a link member included in the scissors jack shown in FIG. 1;

FIG. 3 is a lateral view in partial cross-section of the scissors jack shown in FIG. 1; and FIG. 4 is a lateral view, in enlarged scale, of the scissors jack as shown in FIG. 3, deployed in a partially extended orientation.

DESCRIPTION OF THE PREFERRED EMBODIMENT

A trailer jack assembly designated as 10 and embodying the details of the present invention is adapted to be mounted to the underside of a conventional trailer 15. The trailer jack assembly 10 generally comprises a central C-channel frame member, generally designated 11, mounted in a downwardly open orientation having attached to the ends thereof respectively an end cap 17 and a transverse L-section frame member 19. A trunnion 21 is carried in threaded engagement along a longitudinal screw 25 extending along the interior of member 11, such screw being supported for rotation at opposite ends within corresponding bores in the cap 17 and the member 19. A support leg 27 is pivotally attached at one end or the upper end thereof to the trunnion 21 to be advanced along screw 25 with the trunnion 21 when the screw 25 is turned. A pair of link members, generally designated 29 and 31, pivotally connect at the lower ends thereof to the opposing outside lateral surfaces of the mid-portion of leg 27, extending at the upper ends to pivotally engage the distal ends of the transverse frame member 19. Thus when screw 25 is rotated the trunnion 21 is advanced therealong shortening the dimension between the upper end of the leg 27 and the upper ends of the link members 29 and 31 to deploy the leg 27 to supporting position between the link members. Link members 29 and 31 when deployed provide lateral support between the central section of leg 27 and the distal ends of lateral frame member 19.

More specifically the frame member 11 forms a downwardly open C-channel structure receiving between the side walls thereof the upper end of leg 27 pivoted from trunnion 21. At one end the channel section frame member 11 is capped off by the end cap 17 which comprises an L-section extrusion attached at the exterior vertical side to the one end of frame member 11 and forming in the horizontal side thereof bolt receiving bores 82. The vertical side of end cap 17 further includes a central bore 33 adapted to receive for rotation one end of the screw 25. At the other end the frame member 11 is received within the interior of another L-shaped extrusion forming frame member 19, the vertical section of this L-shaped extrusion including a bore 35 aligned with the cavity of the frame member 11 and adapted to receive the other end of screw 25 to provide the other support thereto. The transverse frame member 19 has its vertical leg turned back at its opposite extremities to form flanges 36 and 39 having respective pivot bores 37 and 38 formed therein for receiving in pivotal engagement respective ends of link members 29 and 31 in a manner further described hereinbelow. Formed in the horizontal leg of the transverse member 19 are mounting bores 32 which, in combination with bores 82, provide means for attachment of the scissors jack assembly 10 to the bottom surface of trailer 15.

As shown in FIG. 2 link members 29 and 31 each comprise reversible triangular structures including an inner or adjacent flange 56 extending from a vertex joining an outer flange 57. The common juncture or vertex of flanges 56 and 57 includes a pivotal bore 58 in an alignment coplanar with flanges 56 and 57 and normal to the longitudinal axis of flange 56. Link members 29 and 31 are connected through bores 58 at their respective vertex, or lower ends, to a transverse connecting bolt 61 which is fixed to extend transversely across the leg 27 at a point substantially central along the longitudinal axis thereof. Specifically the bolt 61 extends beyond the lateral sides of the leg 27 to be received in the respective bores 58 of the corresponding link member 29 and 31, thus providing for a pivotal attachment of the respective vertices of the link members 29 and 31 to the leg 27.

At their open or upper ends the respective inner flanges 56 project to form semi-circular flanges receivable in the vertex of the frame member 19. While the outer flanges 57, at their corresponding upper ends, each include spaced apart tines 71 and 72 respectively extending to align on either side of the corresponding flanges 36 and 39. The tines 71 and 72 further include corresponding bores 73 and 74 located to align with bores 37 and 38 formed in the flanges 36 and 39 of frame member 19 for receipt of respective pivot pins 75. In this manner the outer ends of the flanges 57 are pivotally fixed to the ends of the frame member 19. It is further contemplated that the angular motion of the link members around their respective pins 75 and the length of the fingers on the upper ends of the flanges 56 to be configured to maintain the fingers in abutting relationship within the vertex of the L of frame member 19 at any angular orientation of the link members. Link members 29 and 31 each further include a web 63 spanning between and joining flanges 56 and 57, such web including lightening holes 64. The respective webs 63 provide the requisite column structure between the abutting surfaces of frame member 19 and the pivotal connection at the bolt 61.

Thus the outer flanges 57 are pivotally attached at the respective upper ends thereof to the distal ends of the frame member 19 aligning the interior flanges 56 adjacent frame 11 to place the respective upper ends thereof in abutting relationship with frame member 19. It is to be noted that the center of the pivotal motion of the respective tines 71 and 72 around the corresponding pins 75 in concentric with the semi-circular fingers on the upper ends of flanges 56 thus assuring a constant abutting engagement of flanges 56 with in the interior of frame member 19 as the scissors jack assembly is deployed to any intermediate position. In this manner a compression structure is formed through the interior flanges 56 for transmitting compressive loads between bolt 61 and the end of frame member 11. The respective webs 63 further provide structure for transferring, in shear, the loading from the inner flanges 56 to the outer flanges 57. In this manner a column structure is formed by the link members 29 and 31 connecting the center pivot on leg 27 to the frame member 19.

In operation the jack assembly 10 is normally carried in a collapsed configuration along the bottom surface of a trailer 15, and is extended to a deployed position by the turning of screw 25. Specifically, the deployment of the jack is performed by advancing the upper end of the leg 27 along screw 25 to decrease the dimension along screw 25 and thereby to extend the leg. Link members 29 and 31 fix the dimension of one side of a triangle thus formed while at the same time providing lateral support between the distal ends of frame member 19 and the central pivot on the leg 27. Since normally the extended dimension of the bottom end of leg 27 will be less than the longitudinal dimension thereof the link members form a fulcrum around which the load of the trailer 15 is cantilevered. Thus under normal deployment conditions the load of the trailer 15 is trnsferred in compression through the link members 29 and 31. In addition link members 29 and 31 provide the lateral support against transverse bending of the leg 27 from trunnion 21. This particular load component is transferred in compression along the inner flanges 56 into the vertex of the frame member 19 and only partial load components are taken up in the pivotal joint between the distal ends of the frame member 19 and the flanges 57. In this manner any bending differential across or, transverse to, the leg 27 is taken up through the frame member 19 into the structure of the trailer 15. The corresponding webs 63 joining the inner and outer flanges of the respective link members 29 and 31 further provide structural integrity to prevent column buckling of the link members. Accordingly, the normal bending loads on the leg 27 are transferred through the inner flanges 56 in compression to the central pivot of the leg 27 thereby providing a positive structure for securing the lateral freedom of the leg 27.

Some of the many advantages of the present invention should now be readily apparent. THe invention provides a positive method of fixing laterally the extended leg of a scissors jack in a manner which is easily manufactured and easily assembled. At the same time a positive load transfer is made through the transverse frame member directly to the bottom of the trailer thus utilizing the structure of the trailer to augment the rigidity of the frame of the scissors jack assembly.

Obviously many modifications and variations of the present invention may be made with regard to the foregoing detailed description without departing from the spirit of the invention.

I claim:

1. In a scissors jack of the type adapted to be affixed to the bottom surface of a vehicle including a first frame member disposed in a horizontal alignment, a screw received in said first frame member longitudinal therewith, a support leg threadably engaging said screw in pivotal attachment at one end thereof, and a second frame member attached to said first frame member horizontally normal therewith, the improvement comprising:

support link means disposed for pivotal engagement between a point substantially central to said support leg and the distal ends of said second frame member, including triangular structures having exterior flanges providing said pivotal connections and interior flanges extending along said first frame meber to abut said second frame member.

2. A scissors jack according to claim 1 wherein:
   said support link means further include a rigid web structure formed between said exterior and interior flanges.

3. A scissors jack according to claim 2 wherein:
   said exterior and interior flanges are joined in common at one ends thereof proximate said pivotal point central to said support leg.

4. A scissors jack according to claim 3 wherein:
   said second frame member including planar structures at the distal ends in normal alignment to the longitudinal axis thereof;
   said exterior flange is formed to provide parallel surfaces at the other end thereof disposed to engage in pivotal engagement said planar structures therebetween.

5. In a trailer jack of the scissors type including a first frame member adapted to be attached to the bottom surface of a trailer, a second frame member attached in a transverse relationship to one end of said first frame member, a screw mounted for rotation along the longitudinal axis of said first frame member, a support leg pivotally and threadably engaging at one end thereof said screw and laterally opposing link members pivotally attached between the respective ends of said second frame member and a point central to said support leg, the improvement comprising:

said link members each including an inner flange connected at one end to the point central of said leg and disposed for pivotal motion in a plane parallel to the longitudinal axis of said leg having the other end thereof in abutting relation to said second frame member, an outer flange connected at one end to the one end of said inner flange and extending to pivotally connect at the other end thereof to the distal ends of said second frame member and a planar web structure disposed to extend between said inner and outer flanges.

6. A scissors jack according to claim 5 wherein:

the axis of pivotal motion of said outer flange is substantially parallel to the longitudinal axis of said second frame member.

7. A scissors jack according to claim 6 wherein:

said second frame member includes an L-section extrusion aligned to receive at the interior thereof the other end of said inner flange; and said inner flange includes a semi-circular end of said outer flange, said end structure being dimensioned to a radius terminating at tangents coincident with the inner surfaces of said L-section extrusion.

* * * * *

UNITED STATES PATENT OFFICE
CERTIFICATE OF CORRECTION

Patent No. 3,826,470          Dated July 30, 1974

Inventor(s)   Richard S. Spear

It is certified that error appears in the above-identified patent and that said Letters Patent are hereby corrected as shown below:

In the specification, Column 1, line 43, delete "with" and insert -- which --. Column 3, line 7, "member" and insert -- members --; line 11, "flanges", second occurrence, should read -- fingers --; line 25, "to", first occurrence, should be cancelled; line 41, "in" should read -- is --. Column 4, line 4, "trnsferred" should read -- transferred --; line 25, "THe" should read -- The --. In the claims, Column 4, claim 4, line 66, after "thereof;" insert -- and --. Column 6, claim 7, after "end" insert -- structure concentric with said pivot axis of the other end --.

Signed and sealed this 7th day of January 1975.

(SEAL)
Attest:

McCOY M. GIBSON JR.            C. MARSHALL DANN
Attesting Officer              Commissioner of Patents